United States Patent
Woo et al.

(10) Patent No.: US 9,154,775 B2
(45) Date of Patent: Oct. 6, 2015

(54) MOBILE TERMINAL TO DISPLAY A PERCEIVED 3D IMAGE AND CONTROL METHOD THEREOF

(75) Inventors: Seunghyun Woo, Seoul (KR); Shinhae Lee, Seoul (KR); Hayang Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 623 days.

(21) Appl. No.: 13/149,397

(22) Filed: May 31, 2011

(65) Prior Publication Data
US 2012/0081361 A1    Apr. 5, 2012

(30) Foreign Application Priority Data

Oct. 1, 2010    (KR) .................. 10-2010-0095768

(51) Int. Cl.
| | | |
|---|---|---|
| G06F 3/048 | (2013.01) | |
| H04N 13/04 | (2006.01) | |
| H04N 21/488 | (2011.01) | |
| H04N 21/2343 | (2011.01) | |
| H04N 21/414 | (2011.01) | |
| H04N 21/422 | (2011.01) | |
| H04N 21/4223 | (2011.01) | |

(Continued)

(52) U.S. Cl.
CPC ....... *H04N 13/0452* (2013.01); *H04N 13/0425* (2013.01); *H04N 21/23439* (2013.01); *H04N 21/41407* (2013.01); *H04N 21/4223* (2013.01); *H04N 21/42224* (2013.01); *H04N 21/4415* (2013.01); *H04N 21/4882* (2013.01); *H04N 21/816* (2013.01); *H04N 2213/007* (2013.01)

(58) Field of Classification Search
USPC .......................................... 715/848
See application file for complete search history.

(56) References Cited

U.S. PATENT DOCUMENTS

| | | | | |
|---|---|---|---|---|
| 6,590,573 B1* | 7/2003 | Geshwind | ...................... | 345/419 |
| 6,614,927 B1* | 9/2003 | Tabata | .......................... | 382/154 |
| 7,636,088 B2* | 12/2009 | Nomura et al. | ............... | 345/419 |

(Continued)

FOREIGN PATENT DOCUMENTS

| | | |
|---|---|---|
| CN | 101435919 A | 5/2009 |
| EP | 1 737 248 | 12/2006 |

(Continued)

OTHER PUBLICATIONS

European Search Report dated Jan. 17, 2013 for Application 11005958.1.

(Continued)

*Primary Examiner* — Jennifer To
*Assistant Examiner* — Joseph R Burwell
(74) *Attorney, Agent, or Firm* — KED & Associates, LLP

(57) ABSTRACT

A mobile terminal and controlling method thereof are disclosed, by which a user interface for appreciating a 3-dimensional (3D) stereoscopic image more conveniently can be provided. The present invention includes a display unit including a parallax generating means for displaying a 3D stereoscopic image on at least one portion of the display unit and a controller, when a planar (2D) image is displayed via the display unit, determining whether the 3D stereoscopic image is outputted via the display unit within a preset duration, the controller, if the 3D stereoscopic image is outputted as a result of the determination, controlling a prescribed visual effect indicating that the 3D stereoscopic image is outputted to be given to at least one region of the display unit.

25 Claims, 12 Drawing Sheets

(a)

(b)

(51) Int. Cl.
*H04N 21/4415* (2011.01)
*H04N 21/81* (2011.01)

(56) References Cited

U.S. PATENT DOCUMENTS

| | | | |
|---|---|---|---|
| 2002/0093465 A1* | 7/2002 | Noro | 345/6 |
| 2004/0058715 A1* | 3/2004 | Taniguchi et al. | 455/566 |
| 2004/0070673 A1* | 4/2004 | Nakamura | 348/207.2 |
| 2004/0148631 A1 | 7/2004 | Zubowicz | |
| 2004/0223049 A1* | 11/2004 | Taniguchi et al. | 348/14.02 |
| 2004/0239685 A1* | 12/2004 | Kiyokawa et al. | 345/619 |
| 2006/0103664 A1* | 5/2006 | Nakanishi | 345/619 |
| 2006/0126919 A1* | 6/2006 | Kitaura et al. | 382/154 |
| 2006/0279750 A1* | 12/2006 | Ha | 358/1.2 |
| 2007/0052703 A1* | 3/2007 | Seto | 345/419 |
| 2009/0042607 A1 | 2/2009 | Adachi et al. | |
| 2010/0310232 A1* | 12/2010 | Iwase et al. | 386/241 |
| 2011/0018977 A1* | 1/2011 | Nakamaru | 348/51 |
| 2012/0050500 A1* | 3/2012 | Yamaguchi | 348/51 |
| 2012/0242807 A1* | 9/2012 | Umezu et al. | 348/47 |
| 2013/0258217 A1* | 10/2013 | Azuma et al. | 349/15 |

FOREIGN PATENT DOCUMENTS

| | | |
|---|---|---|
| EP | 1 845 727 A2 | 10/2007 |
| FR | 2 888 000 | 7/2005 |
| JP | 10-271536 | 10/1998 |
| JP | 2002-300610 | 10/2002 |
| JP | 2003-333624 | 11/2003 |

OTHER PUBLICATIONS

European Search Report dated Oct. 29, 2012 for Application 11005958.1.

* cited by examiner (a)

(b)

(c)

(a)

(b)

(a)

(b)

MOBILE TERMINAL TO DISPLAY A PERCEIVED 3D IMAGE AND CONTROL METHOD THEREOF

CROSS-REFERENCE TO RELATED APPLICATION(S)

Pursuant to 35 U.S.C. §119(a), this application claims the benefit of earlier filing date and right of priority to Korean Patent Application No. 10-2010-0095768, filed on Oct. 1, 2010, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for providing a user interface for appreciating a 3-dimensional (3D) stereoscopic image more conveniently.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, since a 2-dimensional (hereinafter abbreviated 2D) image and a 3-dimensional (hereinafter abbreviated 3D) image can be selectively implemented on a display unit of a terminal, the demands for a user interface for appreciating a 3D stereoscopic image more conveniently are ongoing to rise.

BRIEF DESCRIPTION OF THE DRAWINGS

The embodiments will be described in detail with reference to the following drawings in which like reference numerals refer to like elements wherein.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
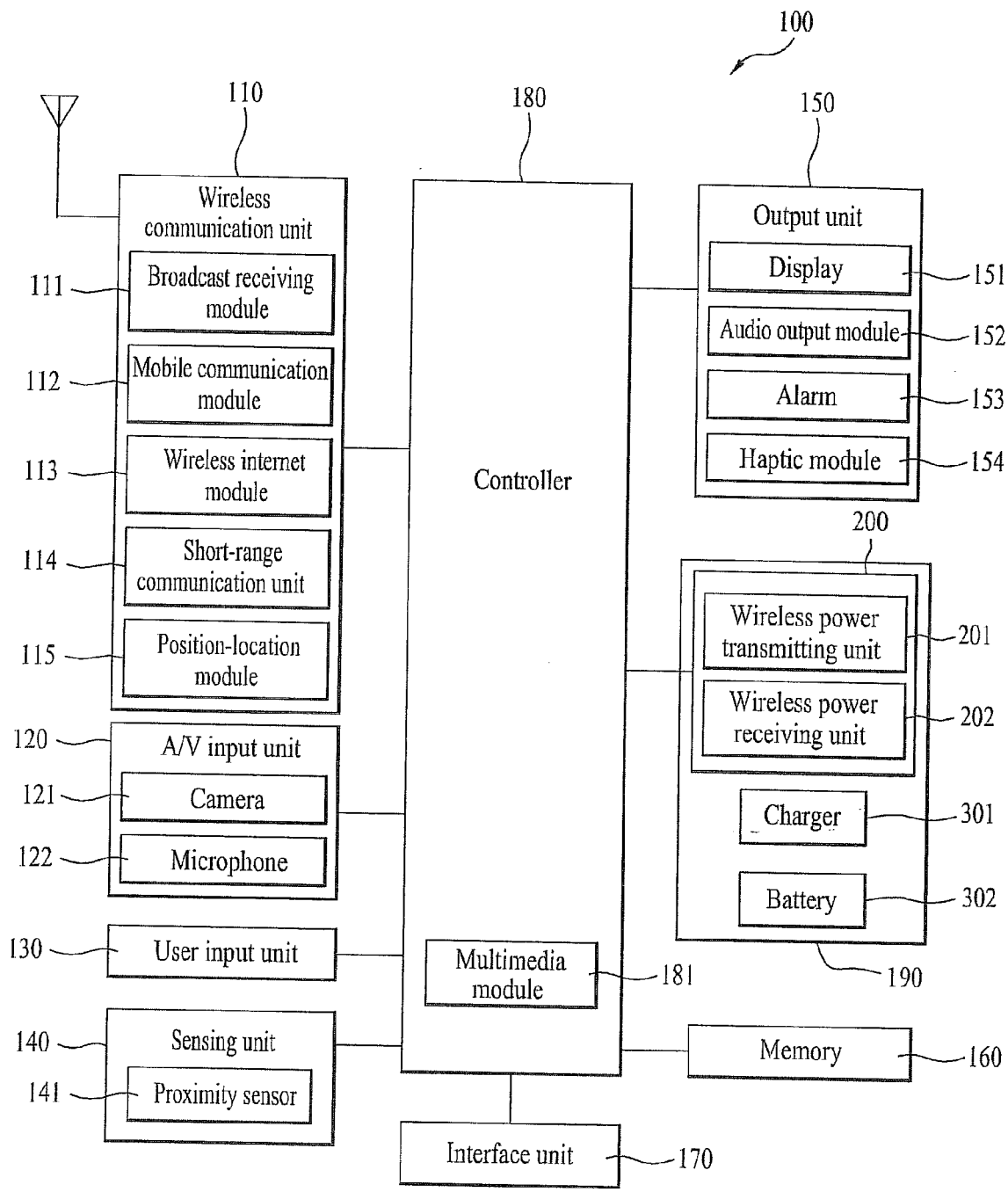
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
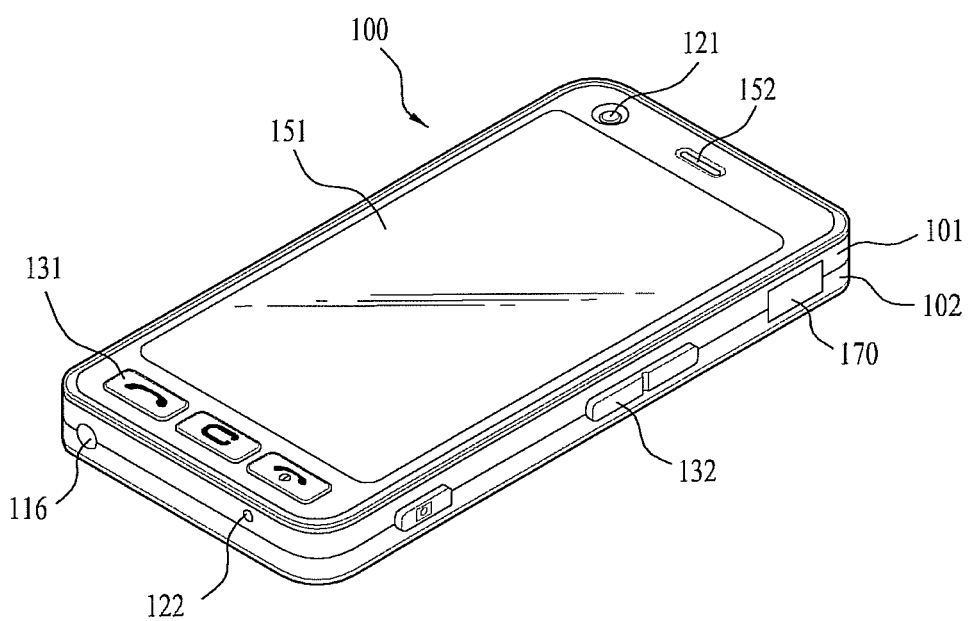
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
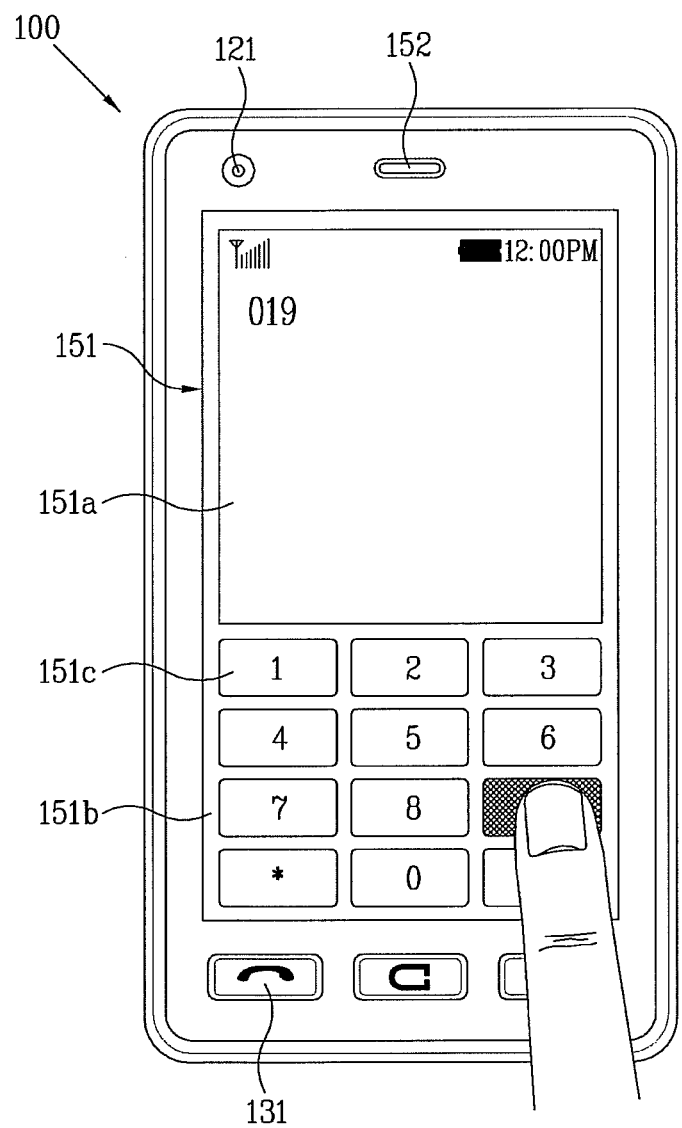
FIG. 3 is a front diagram of a mobile terminal according to one embodiment of the present invention to describe one operative status thereof.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

For clarity and convenience of the following description, a mobile terminal mentioned in the following description is assumed as including at least one of the components shown in FIG. 1. Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In the following description, a method of displaying a 3D image in a mobile terminal applicable to embodiments of the present invention and a display unit configuration for the same are explained.

First of all, 3D images implemented on the display unit 151 of the mobile terminal 100 according to can be mainly classified into two kinds of categories. In this case, the reference for this classification is attributed to whether different images are provided to both eyes, respectively.

The first 3D image category is described as follows.

First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a stereoscopic image can substantially include a planar image.

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a 3D image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 4 as follows.

Figure 4:
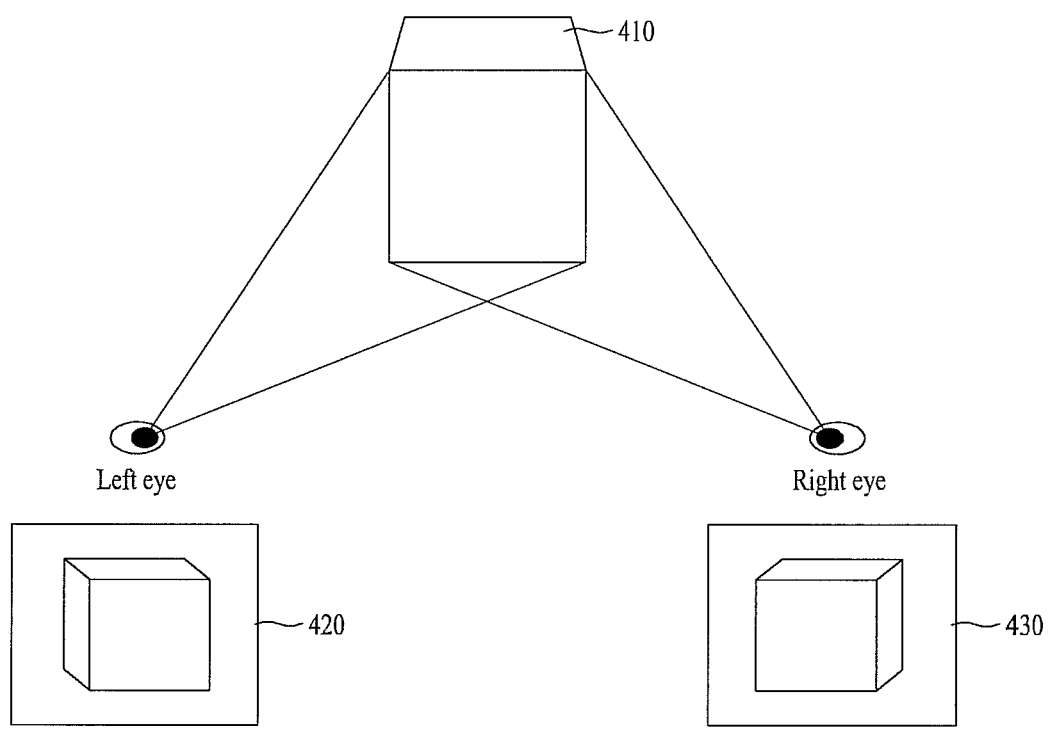
FIG. 4 is a diagram for describing the principle of binocular disparity.

FIG. 4 is a diagram for explaining the principle of binocular disparity.

Referring to FIG. 4, assume a situation that a hexahedron 410 is positioned as a subject in front below an eye's height to be seen through human eyes. In this case, a left eye is able to see a left eye planar image 420 revealing three facets including a top side, a front side and a left lateral side of the hexahedron 410 only. And, a right eye is able to see a right eye planar image 430 revealing three facets including the top side, the front side and a right lateral side of the hexahedron 410 only.

Even if a real thing is not actually positioned in front of both eyes of a user, if the left eye planar image 420 and the right eye planar image 430 are set to arrive at the left eye and the right eye, respectively, a user is able to substantially sense the hexahedron 410 as if looking at the hexahedron 31 actually.

Thus, in order to implement the 3D image belonging to the second category in the mobile terminal 100, images of the same object should arrive at both eyes in a manner of being discriminated from each other for the left and right eye images of the same object with a predetermined parallax.

In order to discriminate the above-mentioned two categories from each other in this disclosure, a stereoscopic image belonging to the first category shall be named 'monoscopic 3D image' and a stereoscopic image belonging to the second category shall be named '3D stereoscopic image'.

A method of implementing a 3D stereoscopic image is described as follows.

First of all, as mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes.

A structure of a parallax barrier type display unit 151 for displaying a 3D image can be configured in a manner that a general display device is combined with a switch LC (liquid crystals). A propagating direction of light is controlled by activating an optical parallax barrier provided to the switch LC, whereby the light is separated into two different lights to arrive at left and right eyes, respectively. Thus, when an image generated from combining an image for the right eye and an image for the left eye together is displayed on the display device, a user sees the images corresponding to the eyes, respectively, thereby feeling the 3D or stereoscopic effect.

Alternatively, the parallax barrier is electrically controlled to enable entire light to be transmitted therethrough, whereby the light separation due to the parallax barrier is avoided. Therefore, the same image can be seen through left and right eyes. In this case, the same function of a conventional display unit is available.

Meanwhile, the parallax barrier provides a 3D stereoscopic image with reference to one axis. Yet, the present invention is able to use a parallax barrier that enables parallel translation in at least two axial directions according to a control signal from the controller 180.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

For clarity of the following description, assume that a mobile terminal according to one embodiment of the present invention includes at least one of the components shown in FIG. 1. In particular, a mobile terminal applicable to the present invention includes a display unit configured to selectively provide a user with a planar image or a 3D stereoscopic image by one of the above described 3D stereoscopic image implementing methods. In this case, the 3D stereoscopic image is displayed on a whole screen of the display unit or can be displayed on the display unit in part.

First Embodiment

When a 3D stereoscopic image is provided to a user by binocular disparity (i.e., spectroscopy), a position of a user toward a display unit becomes an issue. In particular, a user is able to appreciate a preferable 3D stereoscopic image only if a propagation direction of a light, which is delivered to a user to correspond to an image for each eye via a parallax generating means provided to the display unit, corresponds to a position of the corresponding eye of the user. In case that an image provided to a user via a display unit is switched to a 3D stereoscopic image from a planar (2D) image, the user needs to be informed of the image switching in advance in order to secure a view suitable for viewing the 3D stereoscopic image in advance.

For this, one embodiment of the present invention provides various methods of informing a user that an image displayed on a display unit is switched to a 3D stereoscopic image from a planar (2D) image. A 3D stereoscopic image switching indication method according to the present embodiment is explained with reference to FIG. 5 as follows.

Figure 5:
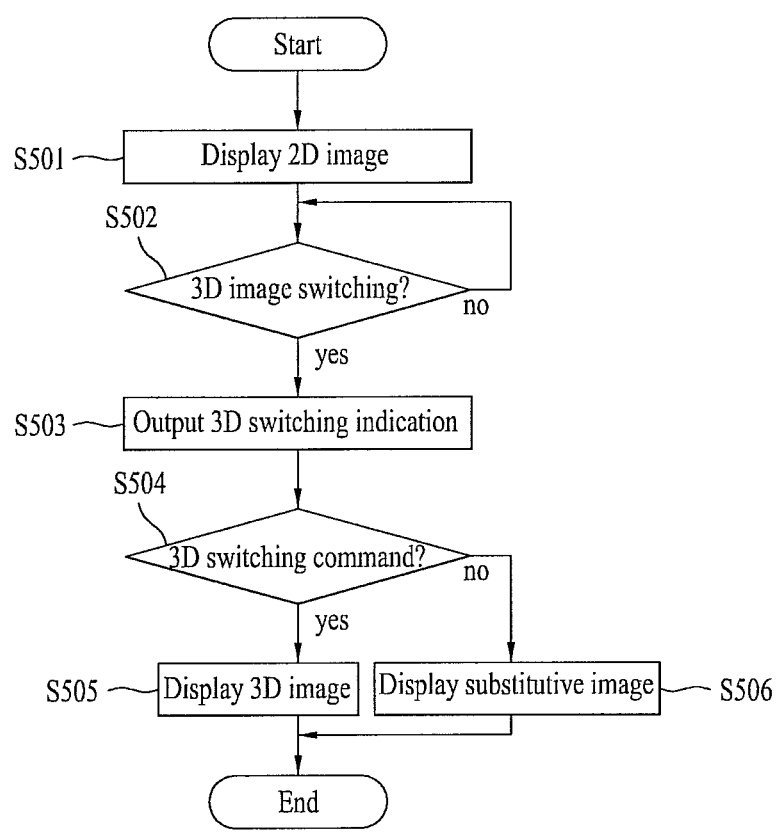
FIG. 5 is a flowchart for one example of a process for informing a user that an image provided via a display unit of a mobile terminal is switched to a 3D stereoscopic image from a planar image according to one embodiment of the present invention.

FIG. 5 is a flowchart for one example of a process for informing a user that an image provided via a display unit of a mobile terminal is switched to a 3D stereoscopic image from a planar (2D) image according to one embodiment of the present invention.

Referring to FIG. 5, a planar image can be provided via a display unit of a mobile terminal [S501].

In this case, no limitation is put on a type of the provided image. For instance, the planar image can include one of a random application execution image, a multimedia contents play image and the like.

While the planar image is being displayed via the display unit, the controller 180 is able to determine whether and when the corresponding planar image is switched to a 3D stereoscopic image [S502].

For example of the determination in the step S502, in case that a multimedia file including at least one portion of a 3D stereoscopic image is played back in the mobile terminal according to the present embodiment, the controller 180 searches the corresponding multimedia file for an image, which is to be played after a preset view from a currently played view, consecutively or periodically and is then able to determine whether the 3D stereoscopic image will be provided after the preset view. Moreover, in case of playing back a content of a real-time download type or a broadcasting/streaming type, if a specific signal is received, the controller 180 is able to determine that a 3D stereoscopic image will be provided after prescribed duration. In this case, it is preferably assumed that a contents provider provides a specific signal indicating that an image will be switched to a 3D stereoscopic image after the prescribed duration. If it is unable to determine whether the image will be switched to the 3D stereoscopic image in advance, the controller 180 determines whether the 3D stereoscopic image is provided by real time.

If the switching to the 3D stereoscopic image is estimated or the image is already switched to the 3D stereoscopic image, the controller 180 is able to inform the user of the switching to the 3D stereoscopic image via at least one of various output means [S503].

In order to inform the user of the switching to the 3D stereoscopic image, a prescribed visual effect is given to at least one region of the display unit, a vibration of a prescribed pattern is generated, or a prescribed indication sound can be generated via an audio output unit. More details shall be described later.

After the indication sound of the switching to the 3D stereoscopic image has been outputted, if a user inputs a command for confirming the switching to the 3D stereoscopic image [S504], the controller 180 is able to control the 3D stereoscopic image to be displayed via the display unit [S505].

If the command for confirming the switching to the 3D stereoscopic image is not given within prescribed duration or the user rejects the switching to the 3D stereoscopic image, the controller 180 is able to control a planar image, which is to substitute for the 3D stereoscopic image, to be displayed via the display unit [S506].

In this case, the planar image for substituting for the 3D stereoscopic image is a previously prepared image or an outputted image for either a left eye or a right eye.

Meanwhile, the controller 180 is able to control the 3D stereoscopic image to be directly provided at the view of providing the 3D stereoscopic image actually without receiving a command for confirming the switching to the 3D stereoscopic image.

In the following description, types of the 3D stereoscopic image switching indication output are explained in detail with reference to FIG. 6.

Figure 6:
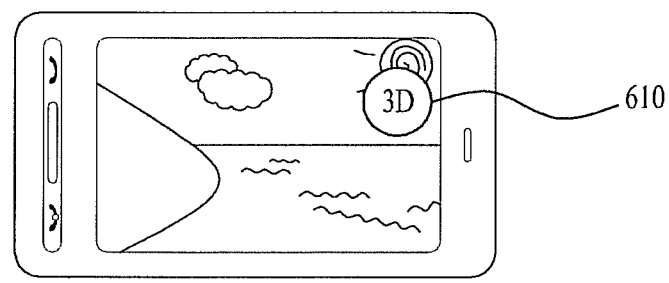
FIG. 6 is a diagram for explaining a method of informing a user that an image provided via a display unit of a mobile terminal is switched to a 3D stereoscopic image from a planar image according to one embodiment of the present invention.
Figure 6:
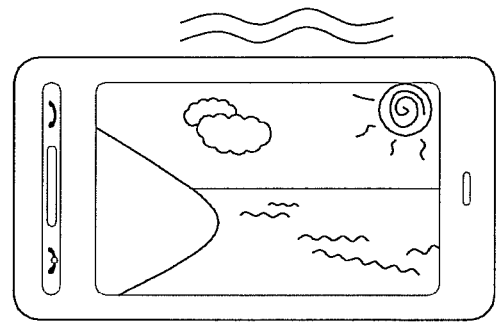
Figure 6:
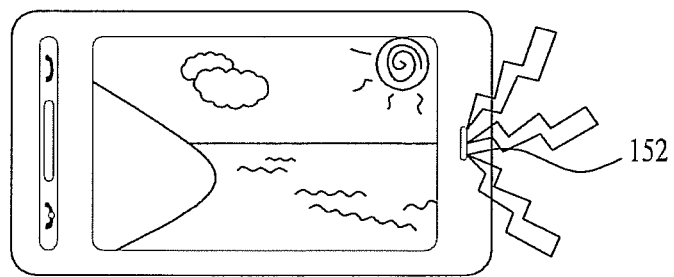

FIG. 6 is a diagram for explaining a method of informing a user that an image provided via a display unit of a mobile terminal is switched to a 3D stereoscopic image from a planar image according to one embodiment of the present invention. In the following description, an output type for indicating the switching to the 3D stereoscopic image is named a 3D indication.

Referring to FIG. 6 (*a*), visual information is usable for a 3D indication. In particular, a 3D icon 610 of a predetermined size can be displayed on a right-top region of the display unit 151. This icon 610 is just exemplary. And, the present invention is non-limited by the icon 610. For instance, the present invention is applicable to various visual effects including a text, an image, a video and combinations thereof.

Referring to FIG. 6 (*b*), a vibration of a prescribed pattern can be provided as the 3D indication. For instance, a vibration of a different pattern or a different count of vibrations can be generated according to a remaining time left to the switching to the 3D stereoscopic image.

Referring to FIG. 6 (*c*), auditory information via the audio output unit 152 can be used for the 3D indication. For instance, a different indication sound can be generated according to a remaining time left to the switching to the 3D stereoscopic image.

Meanwhile, if the 3D indication is visually provided, it is able to display a remaining time left to a view of providing a 3D stereoscopic image. This is explained with reference to FIG. 7 as follows.

Figure 7:
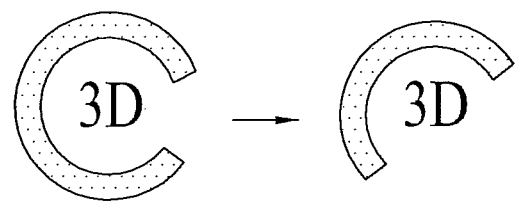
FIG. 7 is a diagram for one example of a method of informing a user of a 3D stereoscopic image switching view visually in a mobile terminal according to one embodiment of the present invention.
Figure 7:

FIG. 7 is a diagram for one example of a method of informing a user of a 3D stereoscopic image switching view visually in a mobile terminal according to one embodiment of the present invention.

Referring to FIG. 7, assume a case that the controller 180 previously obtains a view of switching an image provided via the display unit to a 3D stereoscopic image from a planar image. Moreover, each visual effect shown in FIG. 7 can be displayed at the position similar to that of the icon 610 shown in FIG. 6 (*a*) and can have a size similar to that of the icon 610 shown in FIG. 6 (*a*).

Referring to FIG. 7 (*a*), the 3D stereoscopic image switching view can be indicated in a following manner. First of all, a prescribed gauge gradually keeps decreasing according to elapse of time until completely disappearing. At this timing point, the switching to the 3D stereoscopic image can be performed.

Referring to FIG. 7 (*b*), the 3D stereoscopic image switching view can be indicated in a following manner. First of all, a countdown of numerals keeps varying according to elapse of time until the numeral becomes 0. At this timing point of the numeral 0, the switching to the 3D stereoscopic image is performed.

The gauge type and the countdown method are just exemplary, by which the present invention is non-limited. For instance, the present invention is applicable to such a visual effect for representing a time flow visually as a histogram, a color change and the like.

In the following description, a detailed process for providing a 3 stereoscopic image according to a user's confirmation of a switching to a 3D stereoscopic image is explained with reference to FIG. 8.

Figure 8:
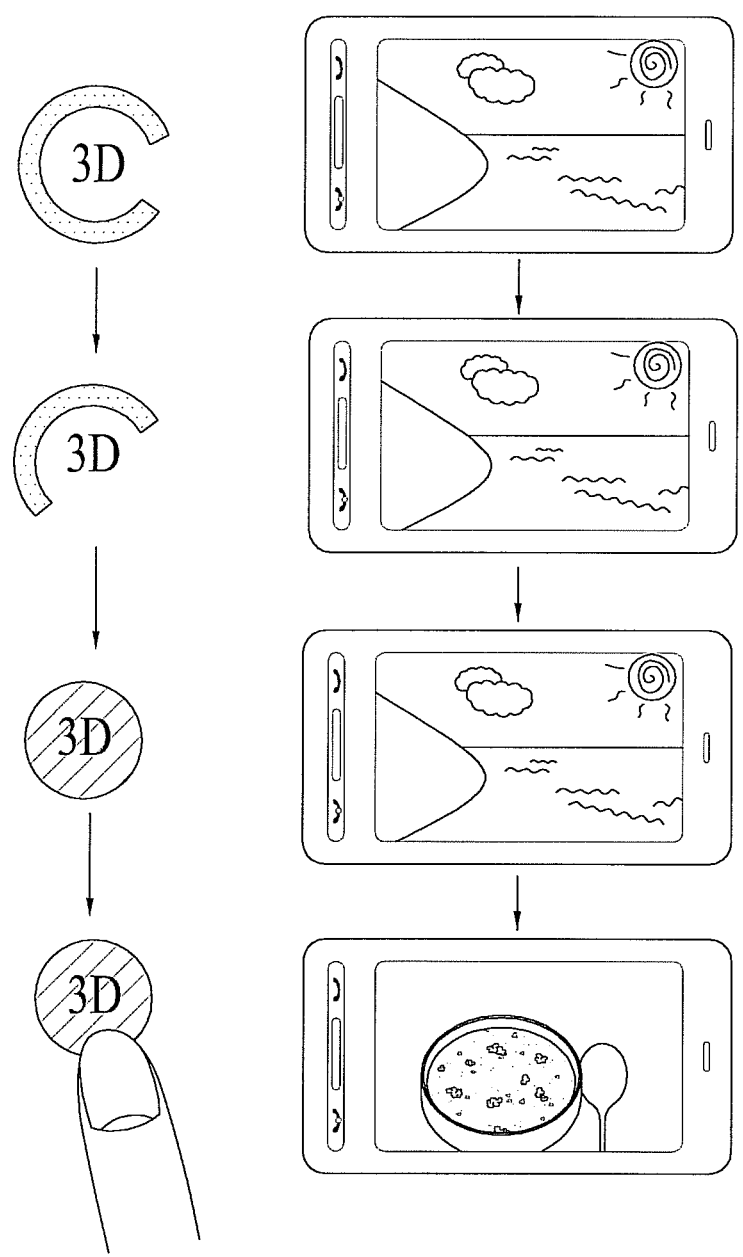
FIG. 8 is a diagram for one example of providing a 3D stereoscopic image according to a user's confirm command in a mobile terminal according to one embodiment of the present invention.

FIG. 8 is a diagram for one example of providing a 3D stereoscopic image according to a user's confirm command in a mobile terminal according to one embodiment of the present invention.

In FIG. 8, assume that such a gauge as shown in FIG. 7 (*a*) is used for a 3D indication. And, assume that the controller obtains a view of switching to a 3D stereoscopic image in advance. A left part of the drawing indicates a gauge type of a 3D indication. And, a right part of the drawing indicates an image displayed on the display unit according to a corresponding 3D indication. Moreover, assume that the 3D indication and an image displayed on the display unit are changed in top-to-bottom direction according to elapse of time.

Referring to FIG. 8, after the controller has obtained a switching view to a 3D stereoscopic image, the controller is able to control a gauge displayed on a prescribed region of the display unit to gradually decrease according to a remaining view. Afterwards, even if the gauge is completely consumed, the controller does not provide the 3D stereoscopic image until a user makes an input. Instead, the controller is able to control the aforesaid substitutive image to be displayed. Afterwards, if the user selects the 3D indication by a touch input or the like, as shown in the most bottom part of the drawing, the 3D stereoscopic image can be displayed on the display unit.

The above mentioned 3D indication methods are independently available. Alternatively, at least two of the above mentioned 3D indication methods are simultaneously available in a manner of being combined together. Moreover, the above mentioned 3D indication methods are usable for methods of indicating that a displayed image is switched to a planar image from a 3D stereoscopic image again, respectively. Yet, in case of informing a user of the switching from the 3D stereoscopic image to the planar image, visual, tactile and auditory effects can be set different from those of the 3D indication.

Second Embodiment

Meanwhile, as mentioned in the foregoing description, a position of a user's eye toward the display unit is important for a 3D stereoscopic image. Therefore, another embodiment of the present invention provides a mobile terminal and controlling method thereof, by which both 3D indication and user's eye correction can be supported. This explained with reference to FIG. 9 as follows.

Figure 9:
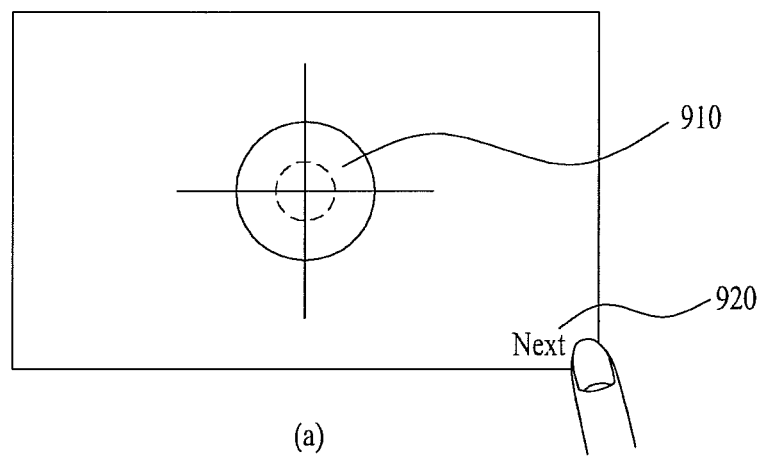
FIG. 9 is a diagram for one example of a visual effect for supporting a user's eye correction as well as indicating that a 3D stereoscopic image is provided in a mobile terminal according to another embodiment of the present invention.
Figure 9:
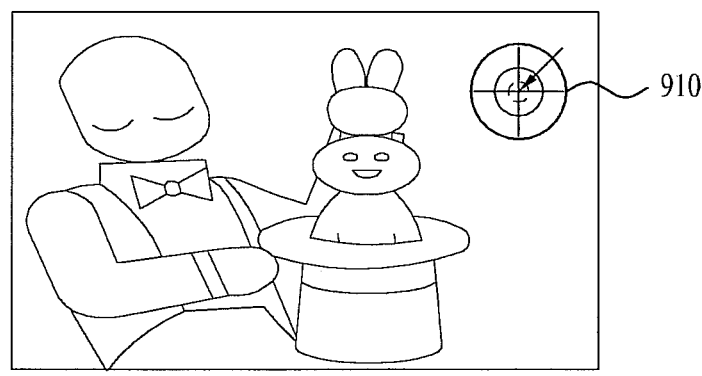

FIG. 9 is a diagram for one example of a visual effect for supporting a user's eye correction as well as indicating that a 3D stereoscopic image is provided in a mobile terminal according to another embodiment of the present invention.

Referring to FIG. 9 (a), the controller determines that a 3D stereoscopic image is provided immediately or after prescribed duration and is then able to control a preset correction image 910 for correcting user's eyes to be displayed on a whole screen of the display unit. In this case, the correction image for correcting user's eyes preferably includes a 3D stereoscopic image having a prescribed 3D depth given thereto. Once the correction image 910 is provided, a user changes eyes to enable the correction image to be seen as a correct 3D stereoscopic image and is then able to manipulate an OK button 920. And, a 3D stereoscopic image can be provided to the display unit correspondingly.

Alternatively, referring to FIG. 9 (b), the above-mentioned correction image 910 of a predetermined size can be displayed on a prescribed region of the display unit instead of the whole screen of the display unit. In case that the correction image 910 is displayed as one type of the 3D indication before the switching to the 3D stereoscopic image, the 3D stereoscopic image effect can be given to the correction image only.

According to another example of the present embodiment, the controller obtains eyeball positions of a user using the camera 121 and is then able to display a view correction range suitable for viewing a 3D stereoscopic image via the obtained positions.

According to the advanced face recognition technology and the like, the controller 180 of the mobile terminal recognizes a user's face from an image obtained via camera and is then able to obtain eye positions from the recognized face. Hence, using the face recognition technology, the mobile terminal according to another example of the present embodiment determines a position suitable for viewing a 3D stereoscopic image provided via the display unit by obtaining positions of user's eyes from the image photographed by the camera 121 and is then able to inform the user of the obtained eye positions visually. This is explained with reference to FIG. 10 as follows.

Figure 10A:
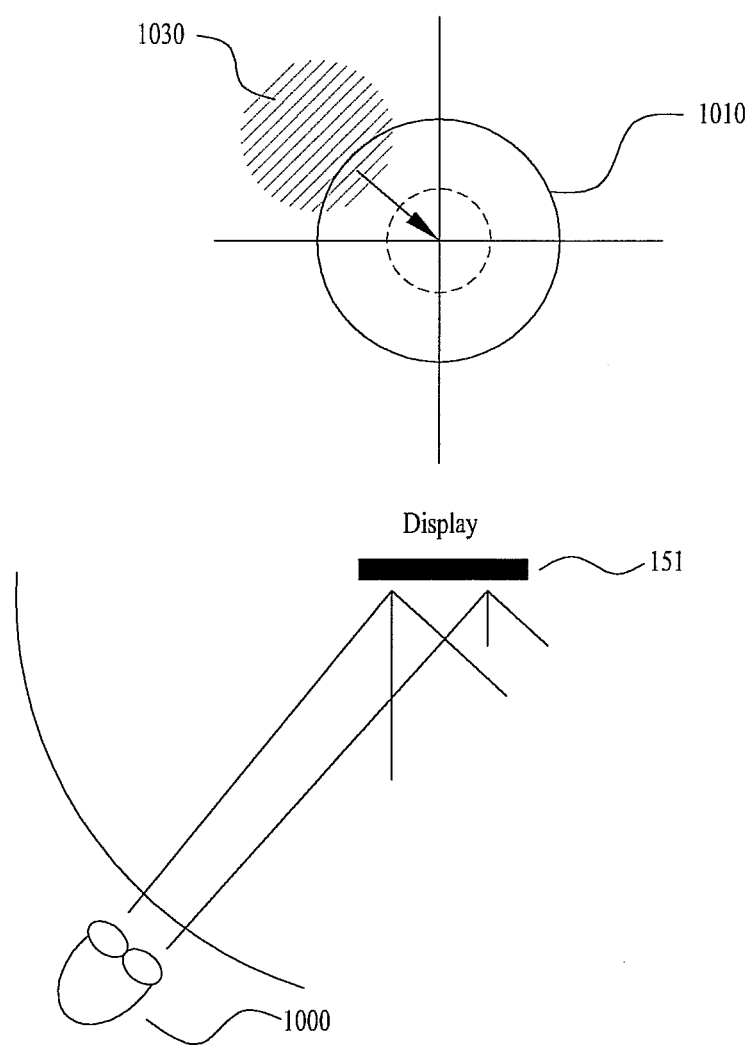
FIGS. 10A to 10C are diagrams for display types of information for a user's eye correction in a mobile terminal according to another embodiment of the present invention.
Figure 10B:
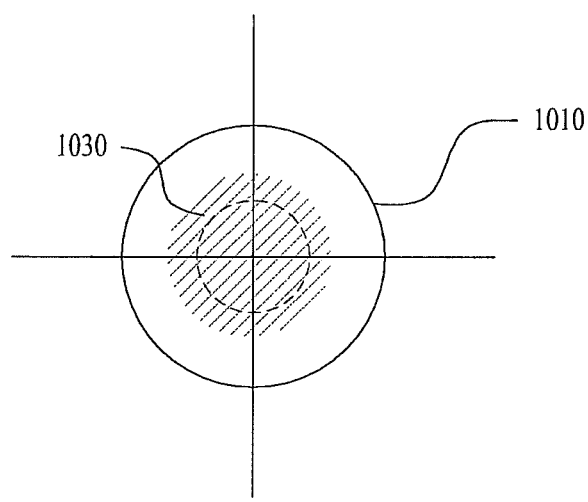
Figure 10B:
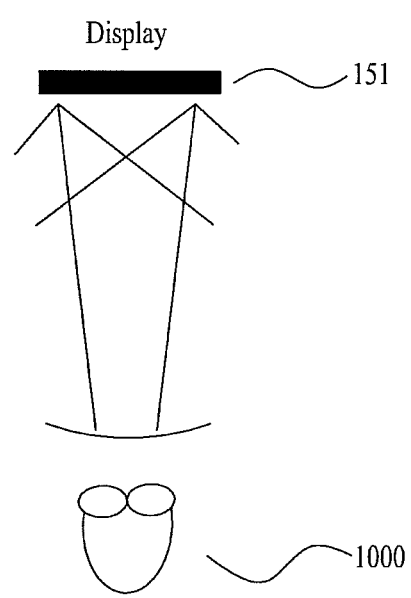
Figure 10C:
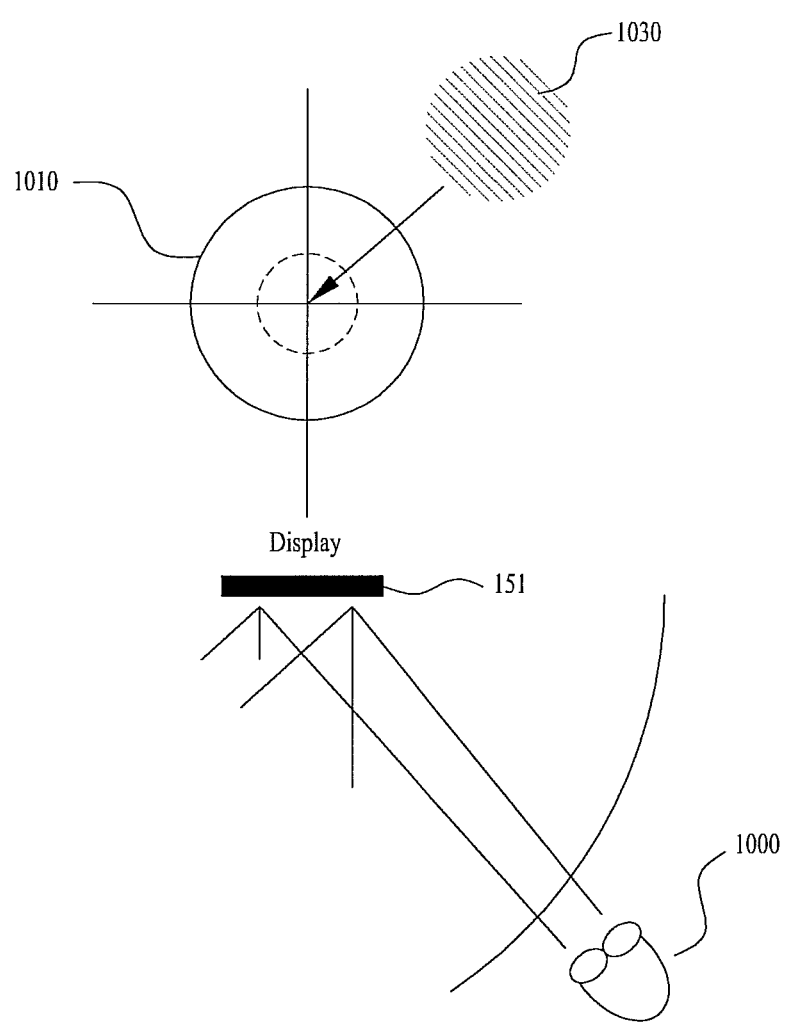

FIGS. 10A to 10C are diagrams for display types of information for a user's eye correction in a mobile terminal according to another embodiment of the present invention.

In FIGS. 10A to 10C, assume that the camera 121 is provided to the mobile terminal 100 in the same direction of the display unit to photograph a user's image situated in front of the display unit.

Referring to FIG. 10A, the controller is able to determine that the user's view 1000 is situated at a left side toward the display unit 151 using an image photographed via the camera. Using the determined user's view 1000, the controller 180 is able to display a reference range finder 1010 and a diagram 1030 indicating a relative position of the user's eye with reference to the reference range finder 1010. Hence, the user is able to obtain his position and a direction for view correction according to a relative position at which the diagram 1030 is displayed from a center point of the range finder indicating an optimal view for appreciating a 3D stereoscopic image.

If the user's view is situated at the optimal position for viewing the 3D stereoscopic image, referring to FIG. 10B, the diagram 1030 is displayed at the center of the reference range finder 1010.

If the user's view deviates at a right top side with reference to the display unit 151, referring to FIG. 10C, the diagram 1030 is displayed at a right top of the reference range finder 1010.

Until the user's view approaches the optimal position, as shown in FIG. 10B, the controller displays a planar image or a substitutive image. Once the user's view approaches the optimal position, the controller is able to control a 3D stereoscopic image to be automatically displayed via the display unit 151.

According to an extent of the deviation of the diagram 1030 from the center of the reference range finder 1010 (i.e., an extent of the deviation of the user's view from the optimal position), the controller 180 is able to control visual effect (e.g., color) to be given to the reference range finder 1010 and/or the diagram 1030.

Moreover, the reference range finder and the diagram can include objects displayed as 3D stereoscopic images until the 3D stereoscopic image is displayed on the display unit.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The mobile terminal having the display unit capable of displaying the stereoscopic image is by combination of structural elements and features of the present invention of a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention is directed to a mobile terminal and controlling method thereof that substantially obviate one or more problems due to limitations and disadvantages of the related art.

An object of the present invention is to provide a mobile terminal and controlling method thereof, by which a more convenient user interface can be provided. In particular, in case that an image displayed on a display unit is switched to a 3D stereoscopic image from a 2D image, a user can be more efficiently informed of a presence or non-presence of the image switching in various ways.

Another object of the present invention is to provide a mobile terminal and controlling method thereof. In particular, in case that an image displayed on a display unit is switched to a 3D stereoscopic image from a 2D image, a user can be more efficiently informed of an optimal viewing angle in various ways.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a parallax generating means for displaying a 3D stereoscopic image on at least one portion of the display unit and a controller, when a planar image is displayed via the display unit, determining whether the 3D stereoscopic image is outputted via the display unit within a preset duration, the controller, if the 3D stereoscopic image is outputted as a result of the determination, controlling a prescribed visual effect indicating that the 3D stereoscopic image is outputted to be given to at least one region of the display unit.

In another aspect of the present invention, a method of controlling a mobile terminal includes the steps of when a planar image is displayed via a display unit including a parallax generating means for displaying a 3D stereoscopic image on at least one portion of the display unit, determining whether the 3D stereoscopic image is outputted via the display unit within a preset duration and if the 3D stereoscopic image is outputted as a result of the determination, controlling a prescribed visual effect indicating that the 3D stereoscopic image is outputted to be given to at least one region of the display unit.

Accordingly, the present invention provides the following effects and/or advantages.

First of all, a user can be informed of at least one of a presence or non-presence of a 3D stereoscopic image switching and a switching view in various ways.

Secondly, a user is able to conveniently recognize a view suitable for viewing a 3D stereoscopic image.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display unit configured to display a two-dimensional (2D) image, and to display a perceived three-dimensional (3D) image; and
a controller configured to:
control the display unit to switch from displaying of the 2D image to displaying of the perceived 3D image and to display a prescribed 3D visual indication having a prescribed 3D depth during a preset duration in advance of the switching to the displaying of the perceived 3D image,
wherein the prescribed 3D visual indication is displayed on a prescribed region of the display unit while the 2D image is displayed on the display unit,
a camera to obtain a face recognition image that includes a user's face, wherein when the perceived 3D image is displayed, the controller determines a first point, at which the user's face is positioned in the face recognition image, and controls visual information displayed on the display unit with the prescribed visual indication, wherein the visual information indicates at least one of a spaced distance between the first point and a preset second point and a direction between the first point and a preset second point.

2. The mobile terminal of claim 1, wherein the controller controls the prescribed visual indication to change based on an amount of remaining time to display the perceived 3D image.

3. The mobile terminal of claim 2, wherein the visual effect includes at least one selected from a numeral having a value that decreases based on the amount of remaining time, a graph having a size that decreases based on the amount of remaining time and a diagram having a size that decreases based on the amount of remaining time.

4. The mobile terminal of claim 2, further comprising an audio output unit, wherein the controller controls a different audio effect that is outputted via the audio output unit based on the amount of remaining time.

5. The mobile terminal of claim 1, further comprising an input unit to receive a command,
wherein when a confirmation command is received via the input unit while the prescribed visual effect is displayed, the controller is further configured to control the display unit to display the perceived 3D image.

6. The mobile terminal of claim 5, wherein the display unit and the input unit form a touchscreen, and wherein when a touch input is determined on a region of the touchscreen corresponding to the prescribed visual effect, the controller determines that the confirmation command is received.

7. The mobile terminal of claim 1, wherein the second point corresponds to a position enabling a left eye image to arrive at a left eye of the user and a right eye image to arrive at a right eye of the user to provide the perceived 3D image.

8. The mobile terminal of claim 1, wherein the visual information includes a first icon corresponding to the first point and a second icon corresponding to the second point.

9. The mobile terminal of claim 8, wherein the controller controls a different color to be provided to the displayed icon based on a distance of the first icon from the second icon.

10. The mobile terminal of claim 1, wherein the camera to obtain a face recognition image that includes a user's eyes,
wherein the controller is further configured to display an eye position indication on the display unit, wherein the displayed position of the eye position indication is adjusted according to an relative position of the user's eyes included in the face recognition image.

11. The mobile terminal of claim 10, wherein the controller is further configured to:
display position reference indication on a preset position of the display unit.

12. A method of controlling a mobile terminal, the method comprising:
displaying a two-dimensional (2D) image on a display unit; and controlling the display unit to switch from displaying of the 2D image to displaying of the perceived 3D image and to display a prescribed 3D visual indication having a prescribed 3D depth during a preset duration in advance of switching to the displaying of the perceived 3D image,
wherein the prescribed 3D visual indication is displayed on a prescribed region of the display unit while the 2D image is displayed on the display unit,
determining a first point at which the user is situated toward the display unit by using an image photographed via a camera,
wherein the visual effect includes visual information indicating at least one of a spaced distance between the first point and a preset second point and a direction between the first point and the preset second point.

13. The method of claim 12, further comprising:
determining whether a confirmation command is received via an input unit while the visual effect is displayed on the display unit; and
as a result of the determining, displaying the perceived 3D image on the display unit when the confirmation command is received.

14. The method of claim 12, further comprising determining a remaining amount of time until displaying the perceived 3D image, wherein the visual effect changes based on the determined remaining amount of time.

15. The method of claim 14, wherein the visual effect includes at least one selected from the group consisting of a numeral having a value that decreases based on the remaining amount of time, a graph having a size that decreases based on the remaining amount of time and a diagram having a size that decreases based on the remaining amount of time.

16. A mobile terminal comprising:
a display unit to display a perceived three-dimensional (3D) image;
a controller configured to control the display unit to switch from displaying of the 2D image to displaying of the perceived 3D image and to display a prescribed 3D visual indication related to the perceived 3D image having a prescribed 3D depth during a preset duration in advance of the switching to the displaying of the perceived 3D image, wherein the displayed prescribed 3D visual indication is changed based on a remaining amount of time to switch to displaying of the perceived 3D image, and wherein the prescribed 3D visual indication is displayed on a prescribed region of the display unit while the 2D image is displayed on the display unit; and
a camera to obtain a face recognition image that includes a user's face, wherein when the perceived 3D image is displayed as a result of the determination, the controller determines a first point at which the user's face is positioned in the face recognition image, and controls visual information displayed on the display unit with the prescribed visual indication, wherein the visual information indicates either a spaced distance between the first point and a preset second point or a direction between the first point and the preset second point.

17. The mobile terminal of claim 16, wherein the visual effect that changes is a displayed numeral that decreases based on the remaining amount of time.

18. The mobile terminal of claim 16, wherein the visual effect that changes is a graph having a size that decreases based on the remaining amount of time.

19. The mobile terminal of claim 16, wherein the visual effect that changes is a diagram having a size that decreases based on the remaining amount of time.

20. The mobile terminal of claim 16, further comprising an audio output unit, wherein the controller controls a different audio effect to be outputted via the audio output unit based on the remaining amount of time.

21. The mobile terminal of claim 16, wherein in response to receiving a confirmation command via the input device, the controller controls the display unit to display the perceived 3D image.

22. The mobile terminal of claim 21, wherein the display unit includes a touch screen, and when a touch input is determined on the prescribed region of the display unit corresponding to the visual effect, the controller determines that the confirmation command is received.

23. The mobile terminal of claim 16, wherein the second point corresponds to a position enabling a left eye image to arrive at a left eye of the user and a right eye image to arrive at a right eye of the user to provide the perceived 3D image to the display unit.

24. The mobile terminal of claim 23, wherein the visual information includes a first icon corresponding to the first point and a second icon corresponding to the second point.

25. The mobile terminal of claim 24, wherein the controller controls a different color to be displayed based on a distance between the first icon and the second icon.

* * * * *